July 10, 1962   L. C. SMALL, JR   3,043,564
STATOR CONSTRUCTION
Original Filed June 4, 1957

INVENTOR
LESLIE C. SMALL, JR.
BY *Vernon F. Hauschild*
ATTORNEY great. Patented July 10, 1962

3,043,564
STATOR CONSTRUCTION

Leslie C. Small, Jr., South Glastonbury, Conn., assignor to United Aircraft Corporation, East Hartford, Conn., a corporation of Delaware
Continuation of application Ser. No. 663,507, June 4, 1957. This application Mar. 14, 1960, Ser. No. 14,581
7 Claims. (Cl. 253—78)

This is a continuation of my copending application Serial Number 663,507 on improvements in Stator Construction filed June 4, 1957, now abandoned.

This invention relates to turbines and compressors of the type used in modern aircraft turbojet engines and more particularly to the stator or stationary vane constructions used therein.

It is an object of this invention to teach a stator construction in which the plurality of stator vanes are free to move radially but are fixed in both axial and circumferential position.

It is a further object of this invention to provide means for limiting the radial movement of the stator vanes, which means also permits vane movement relative to one of the stator shrouds.

It is a further object of this invention to provide inner and outer shrouds for use in a stator construction, which shrouds comprise two rings welded together to define annular cavities which are sufficiently deep that each vane may be moved into one of the shroud cavities to an extent sufficient to free it from contact with the other shroud and such that the free shroud is then axially movable; further, such that one of the rings in each shroud may be prepunched, prior to welding, to receive a plurality of circumferentially spaced vane retaining slots.

It is a further object of this invention to provide a stator unit which utilizes a radially projecting and circumferentially extending ring on the gas passage defining case exterior of the stator and against which the stator outer shroud may abut for thrust load transmitting and gas sealing purposes.

It is a further object of this invention to provide engaging means in the gas passage forming case which mates with engaging means in the stator outer shroud with radial clearance therebetween to radially position the stator with respect to the outer case, but to permit radial movement therebetween and to perform the function of transmitting torque loads from the stator to the outer case.

It is a further object of this invention to provide a stator unit having radially movable vanes with movement limiting projections extending from each vane end such that these projections only need be highly finished for accurate vane positioning purposes.

It is a further object of this invention to teach a stator construction utilizing a one-piece outer case, thereby avoiding the sealing problems associated with a plural piece case, which outer case performs the function of receiving thrust and torque loads from the stator and performs the additional functions of axially and circumferentially positioning the stator and radially positioning the stator so that there is a controlled degree of relative radial movement allowable between the stator and the outer case.

Other objects and advantages will be apparent from the following specification and the attached drawing in which.

For purposes of description simplification, my invention will be described with respect to an axial flow turbine of the type used in modern aircraft turbojet engines, but it should be borne in mind that it is equally applicable to compressors and other gas flow units requiring flow turning stationary vanes.

In the past, considerable difficulty has been encountered in stator constructions due to the fact that the associated parts operate at vastly different temperatures and therefore attempt to expand at different rates, thereby imparting stresses in the associated parts to the extent that metal failure occurs. Constructions used previously utilized vanes which were solidly attached to both inner and outer shrouds to form an integral stator unit and this stator unit was solidly attached to an outer case. The solid attachments just referred to could be by metal fusion, such as welding, or the shrouds, vanes and outer case could be integral. Since the vanes receive the hot gas blast directly from the combustion chambers, they operate at a very high temperature and do not receive the benefit of the cooling air which can be passed over the vane positioning shrouds and the outer case and therefore the vanes attempt to expand thermally at a faster rate than the associated parts setting up the stresses and causing the metal failures described supra. Attempts have been made to relieve this relative thermal expansion problem by selecting materials with different and compensating coefficients of thermal expansion, but such materials were found to be difficult to machine, weld, or fabricate by other methods. My stator unit avoids these problems by fabricating each the inner shroud, the vanes, the outer shroud and the outer case as separate pieces. Further, the vane-to-shroud attachment is such that freedom of radial movement is permitted in the vanes relative to the shrouds and the outer shroud-to-outer case attachment means is such that freedom of radial movement is permitted between the stator unit and the outer case.

Figure 1:
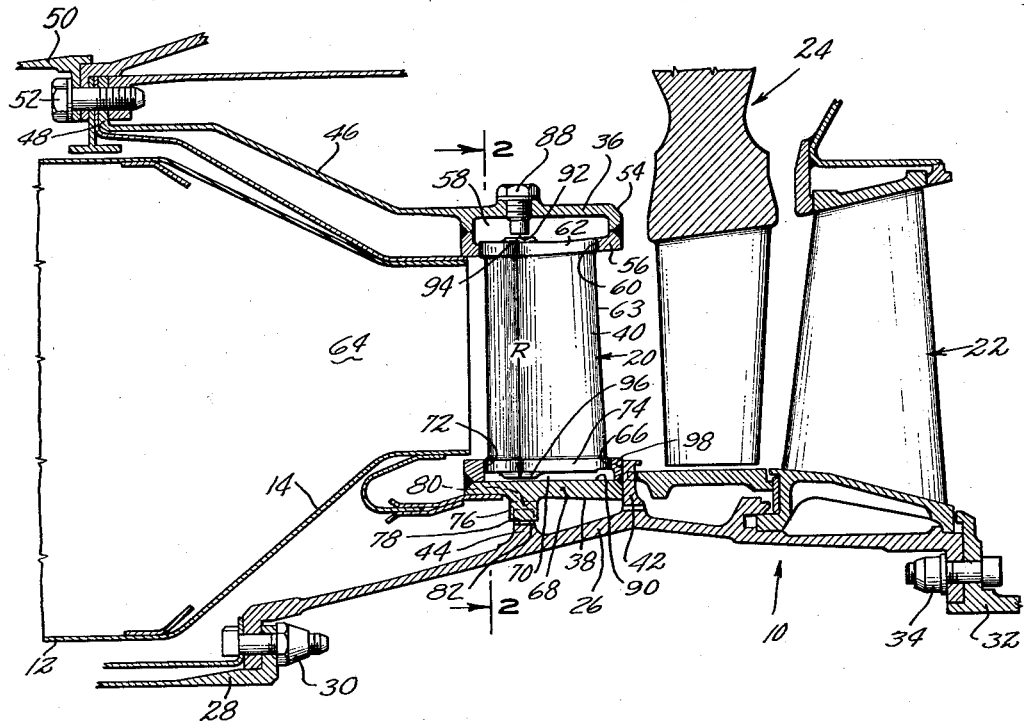
FIG. 1 is a cross-sectional showing of portions of an axial flow turbine with a combustion chamber and diffuser section upstream thereof illustrating an embodiment of my invention.

Referring to FIG. 1 we see axial flow turbine 10 which may be used in a modern aircraft turbojet engine of the type taught in Patents Nos. 2,711,631 and 2,770,946 and which is located downstream of and receives hot gas from combustion chambers 12 thru diffuser section 14. Turbine unit 10 comprises stationary vane stator units 20 and 22 which are axially spaced from and alternately positioned between rotors such as 24. Turbine unit 10 further comprises one-piece outer case 26 which is attached at its forward or upstream end to combustion chamber case 28 by any convenient means such as nut and bolt units 30 and which is attached at its downstream end to another turbine case, an exhaust duct or an afterburner duct 32 by any convenient means such as nut and bolt unit 34. Since rotor 24 and stator 22 do not relate to the invention taught herein per se, they will not be described, but reference is hereby made to U.S. Patent No. 2,851,242 to which reference may be made for a description of these parts.

Applicant's invention lies in stator unit 20 which comprises an inner shroud 36, outer shroud 38 and a plurality of stationary vanes 40 which are positioned by shrouds 36 and 38 and in ring 42 and connecting means 44 of outer case 26. Vanes 40 are preferably equally spaced circumferentially about stator unit 20 and perform the function of turning the gas flow passing therethrough to provide gas to rotor 24 at the desired angle of attack. Inner shroud 36 is supported and positioned by flexible flange 46 which may be either solid or comprised of a plurality of fingers and which attaches through flange 48 to inner combustion chamber case 50 by any convenient attachment means such as threaded bolts 52. Inner shroud 36 comprises inner ring 54 and outer ring 56 which are welded together to form an annular ring enveloping or defining an annular cavity 58. Outer ring 56 is prepunched prior to welding to include a plurality of circumferentially spaced vane receiving slots 60 which are preferably of airfoil cross-section and of such size and shape as to receive and position inner end 62 of vane 40, but with a fit which will permit radial movement between vane 40 and inner shroud 36. Inner end 62 of vane 40 is made slightly larger in airfoil cross-section than is the gas flow turning area 63 of vane 40. It will be noted that annular cavity 58, with vane 40 removed, is in communication with gas passage 64 through slots or holes 60 but with vanes 40 inserted, annular cavity 58 is substantially sealed from gas passage 64 since holes 60 and the plug 88 receiving apertures are the only openings therein.

Figure 2:
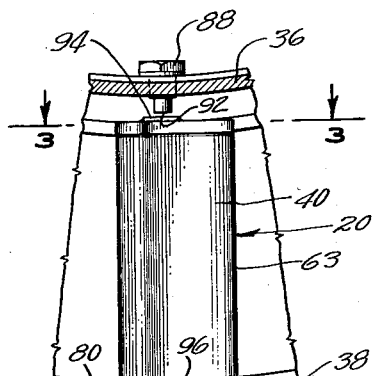
FIG. 2 is a showing taken along line 2—2 of FIG. 1.
Figure 3:
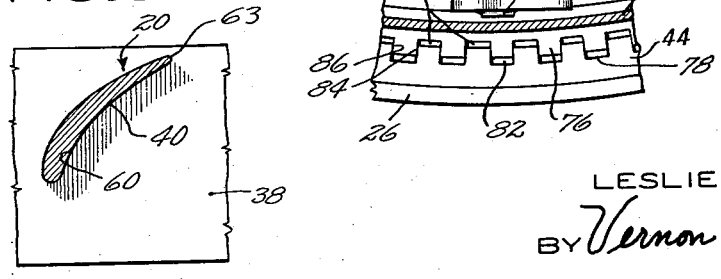
FIG. 3 is a showing taken along line 3—3 of FIG. 2.

Outer shroud 38 comprises inner ring 66 and outer ring 68 which are welded together to form an annular ring enveloping annular cavity 70. Inner ring 66 is prepunched prior to welding to form a plurality of circumferentially spaced vane receiving slots 72 which are of such size and shape as to receive and position outer end 74 of vane 40 but with sufficient looseness that radial movement is permitted between vane 40 and outer shroud 38. Vane outer end 74 is larger in airfoil cross section than vane work area 63 as described for inner end 62. Since slots 72 are the only holes therein, annular cavity 70 is substantially sealed from gas passage 64 when vanes 40 are inserted in slots 72. Outer ring 68 has a plurality of circumferentially positioned and preferably equally spaced lugs 76 (see FIG. 2) projecting therefrom and which are received in mating fashion in grooves 78 located in connecting means 44 of outer case 26. It will be noted by referring to FIG. 2 that lugs 76 are received with radial clearance, shown at 80 and 82 by grooves 78 but are received substantially snugly by circumferential walls 84 and 86 so as to circumferentially position outer shroud 38 and yet permit radial movement between outer case 26 and outer shroud 38. Lugs 76 fit walls 84 and 86 with sufficient looseness that radial movement is permitted between outer shroud 38 and outer case 26.

It will be noted that rings 54 and 56 of inner shroud 36 and rings 66 and 68 of outer shroud 38 are of such shape that they may be continuous rings which will be easily machinable.

Vane radial movement limiting means 88, which may be a threaded bolt, projects through inner case 54 of inner shroud 36 and may be turned so as to move vane 40 radially relative to shrouds 36 and 38 or combine with surface 90 of outer shroud 38 to define the limits of radial movability of vane 40 such that vane 40 may move radially a distance defined by surface 90 of outer shroud 38 and surface 92 of bolt 88. A bolt such as 88 is provided for each vane 40. Vanes 40 may be fabricated in any fashion such as casting and projections 94 and 96 are provided from inner end 62 and outer end 74, respectively, which projections may be machined to provide the proper vane height or radial dimension R to co-act with surfaces 90 and 92 to govern the degree of radial movability of vanes 40.

Inner shroud 36 is so positioned by flexible positioning means 46 that a vane receiving and positioning slot 60 is located radially inboard of a corresponding vane positioning and receiving slot 72 of outer shroud 38 and further such that there is sufficient depth to annular cavities 58 and 70 such that vanes 40 may be moved a sufficient distance into this annular cavity to free the opposite vane end from the other shroud. This principle is used in assembling stator unit 20 by assembling inner shroud 36 in position, placing vanes 40 in slots 60 and moving them radially inward into cavity 58 a sufficient distance to permit outer shroud 38 to be moved axially to a position where it is radially outboard of vanes 40 and engages surface 98 of continuous ring 42 and slots 78 of connecting means 44 at which point bolts 88 are used to move vanes 40 radially outward into proper position in slots 74 of outer shroud 38.

By way of summation it will be noted that stator 20 is positioned axially at its outer end by surface 98 of ring 42 and that ring 42 serves to transmit the thrust load from stator unit 20 to outer case 26 as well as to provide a gas seal therebetween. Outer shroud 38 is circumferentially positioned by the co-action between lugs 76 and slots 78, but such co-action permits radial movement between these parts. Inner shroud 36 is positioned axially and circumferentially by connecting means 46 but has a degree of radial movability due to the flexibility of means 46. Vanes 40 are positioned axially and circumferentially by slots 60 and 72 of vane retaining shrouds 36 and 38 but are free to move radially in either direction to a degree limited by surface 90 of shroud 38 and variable positionable surface 92 of bolts 88.

The torque loads imparted to vanes 40 are equally divided as one-half this load is transferred to slots 60 in shrouds 36, then through case 46 to case 50. The remaining torque load is transferred to slots 72 in shroud 38, then through lugs 76 to outer case 26.

It will be noted that in my construction, vane 40 may move relative to either of shrouds 36 or 38 and case 26, while either shrouds 36 or 38 may move relative to the other and to case 26. This is important in eliminating the stress of connected parts during engine start and cool down when different parts expand or contract at different rates.

It will further be noted that since diffuser section 14 sealably engage both inner shroud 36 and outer shroud 38, and because a sealing action occurs between vanes 40 and shrouds 36 and 38 and, further, between shroud 38 and ring 42, the engine gases from passage 64 will be retained therein. This is of major importance in high pressure ratio engines where leakage problems are severe and the leakage of engine gases from the established gas path 64 behind parts, such as shrouds 36 and 38, and then back into passage 64 causes aerodynamic losses.

It is to be understood that the invention is not limited to the specific embodiment herein illustrated and described, but may be used in other ways without departure from its spirit as defined by the following claims.

I claim:

1. A stator unit concentric about an axis and comprising a rigidly supported outer case of circular cross section having a ring with a smooth forward surface and at least one lug projecting inwardly therefrom, an outer shroud in the form of an axially movable hollow ring having a smooth after surface and defining an annular chamber having an outer surface and positioned forward of and bearing against said case ring with said smooth surfaces in sealing relation and having a plurality of inwardly opening vane receiving holes constituting the sole apertures therein and further having at least one outwardly projecting lug engaging said case lug laterally to prevent outer shroud rotation, and an inner shroud in the form of a hollow ring defining an annular chamber having an inner surface and having a plurality of outwardly opening vane receiving holes constituting the sole apertures therein, vanes projecting between said inner and outer shroud with each slidably received in one of said inner and one of said outer shroud vane receiving holes to permit vane movement relative to either shroud while substantially sealing said annular chambers, and support means to support and position said inner shroud with respect to said outer shroud to define a gas passage therebetween and so that said inner shroud is in radial alignment with said outer shroud when said outer shroud abuts said ring and so that said vanes may be moved radially clear of said inner and outer shroud when abutting said outer and inner surfaces, respectively.

2. A stator unit concentric about an axis and comprising a rigidly supported outer case of circular cross section having a continuous ring with a smooth forward surface and a plurality of circumferentially spaced slots projecting radially inward therefrom, an outer shroud in the form of an axially movable hollow ring having a smooth after surface and defining an annular chamber having an outer surface and positioned forward of and bearing against said case ring with said smooth surfaces in sealing relation and for thrust load transmittal and outer shroud axial position limiting purposes and having a plurality of circumferentially spaced inwardly opening vane receiving holes constituting the sole apertures therein and further having a plurality of outwardly projecting lugs engaging said case slots with radial clearance for torque load transmittal, thermal expansion and outer shroud radial and circumferential positioning purposes, an inner shroud in the form of a hollow ring defining an annular chamber having an inner surface and having a plurality of outwardly opening vane receiving holes constituting the sole apertures therein, means to position said inner shroud so that each of said inner shroud holes is positioned radially inboard of one of said outer shroud vane receiving holes, radially movable vanes projecting between said inner and said outer shroud with one end of each vane radially slidably received in and axially and circumferentially positioned by one of said inner shroud holes and with the other end of each vane slidably received in and axially and circumferentially positioned by the radially aligned outer shroud vane receiving hole to permit vane movement relative to either shroud while substantially sealing said annular chambers, and adjustable means to limit the radial movement of said vanes and to individually position each of said vanes radially.

3. A stator unit concentric about an axis and comprising a rigidly supported outer case of circular cross section enveloping a gas passage and having a continuous ring with a smooth forward surface and a plurality of circumferentially spaced slots projecting radially inwardly therefrom, an axially movable outer shroud in the form of an outer ring having a plurality of circumferentially spaced teeth projecting outwardly therefrom and engaging said case slots with radial clearance for torque load transmittal, thermal expansion and outer shroud radial and circumferential positioning purposes joined by metal fusion to an inner ring having a plurality of radially inwardly opening vane receiving holes therein to form a hollow ring with a smooth after surface and defining an annular cavity communicating with said gas passage through said inner ring holes solely and which annular ring smooth surface bears against said case ring smooth surface for thrust load transmittal, gas sealing, and outer shroud axial position limiting purposes, an inner shroud in the form of an outer ring having a plurality of radially outwardly opening vane receiving holes joined by metal fusion to an inner ring to form a hollow ring defining an annular cavity communicating with said gas passage through said outer ring holes solely, vanes projecting between said inner and outer shroud with each radially slidably received in an axially and circumferentially positioned by one of said inner and one of said outer shroud vane receiving holes to substantially seal said annular cavities from said gas passage, means to seal the forward ends of said shrouds from said gas passage, and means to support and position said inner shroud with respect to said outer shroud so that one of said inner shroud holes is in radial alignment with one of said outer shroud holes when said outer shroud abuts said ring and so that said vanes may be moved radially into one of said shroud annular cavities a sufficient distance to disengage said vanes from the other shroud.

4. A stator unit concentric about an axis and comprising a rigidly supported outer case of circular cross section enveloping a gas passage and having a continuous ring with a smooth forward surface and a plurality of circumferentially spaced slots projecting radially inwardly therefrom, an axially moveable outer shroud in the form of an outer ring having a plurality of circumferentially spaced teeth projecting radially outwardly therefrom and laterally engaging said case slots with radial clearance for torque load transmittal, thermal expansion and outer shroud radial and circumferential positioning purposes joined by metal fusion to an inner ring radially spaced therefrom and having a plurality of radially inwardly opening vane receiving holes constituting the sole apertures therein to form a hollow ring with a smooth after surface and defining an annular cavity communicating with said gas passage through said inner ring holes solely and which annular ring smooth surface bears against said case ring smooth surface for thrust load transmittal, gas sealing, and outer shroud axial position limiting purposes, an inner shroud in the form of an outer ring having a plurality of radially outwardly opening vane receiving holes joined by metal fusion to an inner ring radially spaced therefrom to form a hollow ring defining an annular cavity communicating with said gas passage through said outer ring holes solely, vanes projecting between said inner and outer shroud with each of said vanes radially slidably received in and axially and circumferentially positioned by one of said inner and one of said outer shroud vane receiving holes to substantially seal said annular cavities from said gas passage, means to seal the forward ends of said shrouds from said gas passage, and support means to support and position said inner shroud with respect to said outer shroud so that one of said inner shroud holes is in radial alignment with one of said outer shroud holes when said outer shroud abuts said ring and so that said vanes may be moved radially into one of said shroud annular cavities a sufficient distance to disengage said vanes from the other shroud, means movable in one of said shrouds to limit the radial movement of said vanes and to move said vanes with respect to said shroud, and a smooth surfaced projection extending from each end of said vanes to contact one shroud at said vane movement limiting means and said other shroud.

5. A gas flow unit of generally circular cross-section and concentric about an axis and comprising a one piece, rigidly supported outer case, a solid walled gas diffuser section enveloped within said outer case, a stator unit located rearwardly of said diffuser section and comprising a hollow outer shroud ring defining an annular cavity and having inwardly opening apertures constituting the sole openings therein, a hollow inner shroud ring defining an annular cavity and having outwardly opening apertures constituting the sole openings therein, means to position said outer and inner shrouds so that each of said inner shroud apertures is radially aligned with one of said outer shroud apertures, radially movable vanes extending between said shrouds with each vane radially slidably received in and axially and circumferentially positioned by one of said inner shroud apertures and one of said outer shroud apertures, solely so that said cavities are substantially sealed thereby, seal means joining said diffuser section and said shrouds so that said diffuser section and said stator unit cooperate to define a gas passage so that all gas passing thru said diffuser section will pass directly between said shrouds and said vanes and means projecting from said outer case and engaging said outer shroud to transmit thrust and torque loads therebetween.

6. A gas flow unit of generally circular cross-section and concentric about an axis and comprising a rigidly supported outer case and having a ring and circumferentially spaced slots projecting radially inward therefrom, a solid walled gas diffuser section enveloped within said outer case, a stator unit located rearwardly of said diffuser section and comprising a hollow outer shroud ring abutting said case ring and defining an annular cavity and having circumferentially spaced inwardly opening apertures constituting the sole openings therein and further having circumferentially spaced lugs projecting radially outward therefrom and engaging said case slots on with radial clearance therebetween, a hollow inner shroud ring defining an annular cavity and having circumferentially spaced outwardly opening apertures constituting the sole openings therein, flexible means to position said inner shroud with respect to said outer shroud so positioned that each of said inner shroud apertures is radially aligned with one of said outer shroud apertures radially extending and movable vanes extending between said shrouds with each vane radially slidably received in and axially and circumferentially positioned by one of said inner shroud apertures and one of said outer shroud apertures, so that said cavities are substantially sealed thereby, seal means joining said diffuser section and said shrouds so that said diffuser section and said stator unit cooperate to define a gas passage so that all gas passing thru said diffuser section will pass directly between said shrouds and said vanes.

7. A gas flow unit of generally circular cross-section and concentric about an axis and comprising a rigidly supported outer case of circular cross-section and having connecting means and a ring projecting radially inward therefrom, a solid walled gas diffuser section enveloped within said outer case, a stator unit located rearwardly of said diffuser section and comprising a hollow inner shroud ring defining an annular cavity and having outwardly opening apertures constituting the sole openings therein and of such size as to be axially movable within said outer case, a hollow outer shroud ring defining an annular cavity and having inwardly opening apertures constituting the sole openings therein and being of such size as to be axially movable within said outer case forward of said ring and having connecting means positioned and shaped to mate with said outer case connecting means when said outer shroud ring abuts said case ring, axially removable means locating and positioning said inner shroud radially inboard of said outer shroud so positioned that each inner shroud aperture is radially aligned with an outer shroud aperture, radially movable vanes extending between said shrouds with each vane radially slidably received in and axially and circumferentially positioned by one of said inner shroud apertures and one of said outer shroud apertures so that said cavities are substantially sealed thereby, seal means joining said diffuser section and said shrouds so that said diffuser section and said stator unit cooperate to define a gas passage so that all gas passing thru said diffuser section will pass directly between said shrouds and said vanes, and adjustable means to move said vanes individually radially within said apertures and to control the amount of vane radial movability.

References Cited in the file of this patent

UNITED STATES PATENTS

| | | |
|---|---|---|
| 1,242,578 | Moore | Oct. 9, 1917 |
| 2,447,942 | Imbert et al. | Aug. 24, 1948 |
| 2,763,462 | McDowall et al. | Sept. 18, 1956 |
| 2,801,075 | Broffit | July 30, 1957 |

FOREIGN PATENTS

| | | |
|---|---|---|
| 336,739 | France | Jan. 26, 1904 |
| 689,270 | Great Britain | Mar. 25, 1953 |
| 721,453 | Great Britain | Jan. 5, 1955 |
| 970,723 | France | June 21, 1950 |